United States Patent [19]

Fong et al.

[11] Patent Number: 4,919,821

[45] Date of Patent: Apr. 24, 1990

[54] MODIFIED MALEIC ANHYDRIDE POLYMERS AND THE LIKE FOR USE AS SCALE INHIBITORS

[75] Inventors: Dodd W. Fong; John E. Hoots; Donald A. Johnson, all of Naperville; James Kneller, LaGrange Park, all of Ill.

[73] Assignee: Nalco Chemical Company, Naperville, Ill.

[21] Appl. No.: 239,137

[22] Filed: Aug. 31, 1988

Related U.S. Application Data

[60] Division of Ser. No. 934,598, Nov. 25, 1986, Pat. No. 4,801,388, which is a continuation-in-part of Ser. No. 842,568, Mar. 21, 1986, abandoned.

[51] Int. Cl.$^5$ ................................. C02F 5/12
[52] U.S. Cl. .................... 210/698; 252/180; 210/701
[58] Field of Search ............... 210/698–701; 252/180, 181

[56] References Cited

U.S. PATENT DOCUMENTS

| 3,285,886 | 11/1966 | Gunderson | 260/80.3 |
|---|---|---|---|
| 3,709,815 | 1/1973 | Boothe et al. | 210/58 |
| 3,709,816 | 1/1973 | Walker et al. | 210/58 |
| 3,806,367 | 4/1974 | Lange et al. | 134/3 |
| 3,928,196 | 12/1975 | Persinski et al. | 210/58 |
| 4,401,587 | 8/1983 | Boffardi | 252/389 |
| 4,446,028 | 5/1984 | Becker | 210/697 |
| 4,536,292 | 8/1985 | Matz | 210/701 |
| 4,584,105 | 4/1986 | Fong | 210/701 |
| 4,604,431 | 8/1986 | Fong et al. | 525/351 |
| 4,640,793 | 2/1987 | Persinski et al. | 210/701 |
| 4,673,508 | 6/1987 | Coleman et al. | 210/698 |
| 4,676,911 | 6/1987 | Fong | 210/701 |
| 4,703,092 | 10/1987 | Fong | 525/351 |
| 4,740,314 | 4/1988 | Kneller | 210/698 |
| 4,752,443 | 6/1988 | Hoots et al. | 422/13 |
| 4,801,388 | 1/1989 | Fong et al. | 210/701 |

FOREIGN PATENT DOCUMENTS

| 86115026 | 5/1987 | European Pat. Off. | |
| 187489 | 5/1985 | Japan . | |
| 187491 | 5/1985 | Japan . | |
| 2181735 | 4/1987 | United Kingdom | 210/698 |

*Primary Examiner*—Peter Hruskoci
*Attorney, Agent, or Firm*—Joan I. Norek; Robert A. Miller; Donald G. Epple

[57] ABSTRACT

Water supplies are treated to inhibit the formation of scale deposits of alkaline earth phosphates, phosphonates, sulphates and carbonates using various hydrocarbon polymers which contain an amido functionality and which have been prepared by post-polymerization derivatization.

6 Claims, No Drawings

MODIFIED MALEIC ANHYDRIDE POLYMERS AND THE LIKE FOR USE AS SCALE INHIBITORS

This is a division of application serial no. 934,598, filed 11/25/86, now Pat. No. 4801388, which was a continuation-in-part application of copending application serial no. 842,568, filed on Mar. 21, 1986, now abandoned.

FIELD OF THE INVENTION

This invention relates generally to the preparation and use of water-soluble polymeric compounds which have special utility as scale inhibiting agents.

BACKGROUND OF THE INVENTION

One important general application of water-treatment chemicals resides in controlling the mineral content of boiler feed water in electric power generation facilities, for example. Even water supplies that have been pre-treated by zeolite softening can form 400 to 4,000 pounds of scale deposits per year in a typical boiler that is generating 200,000 pounds of steam per hour, concomitantly reducing heat transfer efficiency and leading ultimately to corrosion and tube failure. The use of such chelants as nitrilotriacetic acid and ethylenediaminetetraacetic acid has proved superior to treatment of boiler feed water with soluble inorganic phosphates; but such chelants require careful monitoring if corrosion is to be minimized. Introduction of prior art water-soluble, synthetic polymers to serve as dispersants and crystal modifiers, in conjunction with phosphates or chelants, has lessened the corrosion hazard but has not eliminated the need for periodic cleaning of the boiler system to remove scale deposits.

Cooling water systems pose equally serious problems in controlling scale accumulation in order to promote both thermal and pumping efficiency.

Scale deposits are generated and extended principally by means of crystal growth; and various approaches to reducing scale development have accordingly included inhibition of crystal growth, modification of crystal growth and dispersion of the scale-forming minerals.

Certain polyacrylates and hydrolyzed polyacrylamides have been proposed heretofore as mineral dispersants in industrial water systems but have been found to exhibit undesirably low tolerance for calcium ion, resulting in calcium precipitates of their own, especially in water of high hardness initially or as a result of concentration from recycling in a cooling water system. Lignosulfonate dispersants, on the other hand, while effective in many situations, particularly where iron-fouling is a problem, are subject to oxidative destruction and are, as a consequence, comparatively uneconomical in the long run.

Accordingly, a general object of the present invention is to provide a family of water-soluble polymers which are hydrolytically stable and comparatively unreactive with hardness cations and which are effective as dispersants and especially as scale inhibitors.

Another important object of the invention is to achieve high-performance scale inhibition using a unique series of copolymers and terpolymers prepared by post-polymerization derivatization using direct amidation of polyalkyl carboxylic acids and transamidation of copolymers containing carboxylic acid and (meth)acrylamide units.

Still another object of the invention is to provide water-soluble polymeric sulfonates which have special utility as water-treatment chemicals, together with advantageous methods of synthesizing such sulfonates.

One specific object of the invention is to provide 2,3-dihydroxypropylamide-, 2-hydroxy-3-sulfopropylamide-, sulfomethylamide-, sulfoethylamide- and sulfophenylamide-containing polymers for use as scale inhibitors and the like in industrial water systems.

These and other objects and features of the invention will become apparent from the following descriptions.

SUMMARY OF THE INVENTION

Significant activity in inhibiting the formation of scale deposits has been exhibited by copolymers and terpolymers that have been prepared by post-polymerization derivatization. The derivatizing agents of the invention are hydrocarbon groups containing both an amino functionality and at least one of the following groups:
[1] (poly)hydroxy alkyl(aryl);
[2] alkyl and aryl(poly)carboxylic acids and ester analogues;
[3] amino alkyl(aryl) and quaternized amine analogues;
[4] halogenated alkyl(aryl);
[5] (poly)ether alkyl (aryl);
[6] (di)alkyl;
[7] alkyl phosphonic acid;
[8] alkyl keto carboxylic acid;
[9] hydroxyalkyl sulfonic acid; and
[10] (aryl)alkyl sulfonic acid, wherein the prefix "poly" refers to two or more such functionalities.

The derivatization process of the invention includes direct amidation of polyalkyl carboxylic acids and transamidation of copolymers containing carboxylic acid and (meth)acrylamide units.

Particularly advantageous sulfomethylamide-, sulfoethylamide-, sulfophenylamide-, 2-hydroxy-3-sulfopropylamide- and 2,3-dihydroxypropylamide-containing polymers of the present invention are produced by transamidation using acrylamide homopolymers and copolymers, including terpolymers, which have a mole ratio of acrylamide or homologous units of at least about 10%. The transamidation is achieved using such reactants as aminomethanesulfonic acid, 2-aminoethanesulfonic acid (taurine), 4-aminobenzenesulfonic acid (p-sulfanilic acid), 1-amino-2-hydroxy-3-propanesulfonic acid, or 2,3-dihydroxypropylamine in aqueous or like polar media at temperatures on the order of about 150° C. Once initiated, the reactions go essentially to completion.

Other particularly advantageous polymeric sulfonates of the present invention are produced by an addition reaction between an aminosulfonic acid, such as sulfanilic acid, and taurine, or their sodium salts, and a copolymer of maleic anhydride and a vinylic compound such as styrene, methyl vinyl ether, or (meth)acrylamide.

DETAILED DESCRIPTION OF THE INVENTION

It has been found that the post-polymerization derivatized hydrocarbon polymers of the invention are very effective scale inhibitors for cooling water, boiler water, industrial and petroleum process water, and oil well drilling water. Testing results tabulated in Tables I and VI set forth hereinafter show these materials are very effective scale inhibitors. Eminently useful compounds according to the invention include:

(1) N-substituted amide polymers with an amide structure as follows:

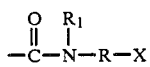

where $R_1$ is hydrogen or alkyl and R is alkylene or phenylene, and X is sulfonate, phosphonate, (poly)-hydroxyl, (poly)carboxyl or carbonyl and combinations thereof; and (2) derivatized maleic anhydride homo-, co- and terpolymers having N-substituted maleamic acid units, N-substituted maleimide units and maleic acid (and salts) units such units having structures as follows:

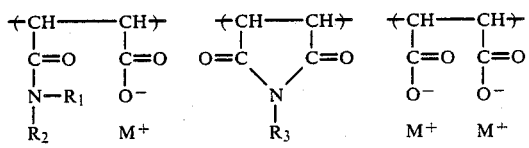

where $R_1$, $R_2$ and $R_3$ are each independently chosen from the group consisting of hydrogen, hydroxyl, carboxyalkyl, carboxyamide, phenyl, substituted phenyl, linear and branched alkyl of from one to ten carbon atoms, and substituted alkyl of from one to ten carbon atoms, where the substituent may be (poly)hydroxyl; carbonyl; phosphonic acid; phosphinic acid; sulfonic acid, sulfate ester; phosphate ester; alkoxy, carboxylate ester; carboxyamide and (poly)carboxylic groups; and combinations thereof; at least one of $R_1$, $R_2$ and $R_3$ provide N-substitution to the derivatized maleic anhydride homo-, co-, or terpolymer; and $M^+$ may be $H^+$, alkali metal ions, alkaline earth metal ions, ammonium ions and wherein: wherein n is an integer in the range from 10 to about 1200; the total moles of maleamic acid (salt) units in the polymer is xn (x times n), wherein x is a number from 0 to about 1.0 and n is as defined above; the total moles of maleimide units in the polymer is yn (y times n), wherein y is a number from 0 to about 0.95 and n is as defined above; and the total moles of maleic acid (salts) units in the polymer is zn (z times n), wherein z is a number from 0 to about 0.95 and n is as defined above; and wherein $x+y+z=1$. In preferred embodiment such derivatized homo-, co- and terpolymers having N-substituted maleamic acid units are those made by reacting maleic anhydride homo-, co- and terpolymers with an aminosulfonate source selected from the class consisting essentially of aminoalkylsulfonic acids where the alkyl group is linear or branched, from one to ten carbon atoms and may be further substituted by hydroxyl, carboxylic and phosphonic groups and combinations thereof; and alkali metal and ammonium salts of said aminoalkylsulfonic acids wherein: the total moles of derivatized and underivatized maleic units in the polymer is n, wherein n is an integer in the range from 30 to about 1000 the total moles of maleamic acid (salt) units in the polymer is xn, wherein x is a number from 0.5 to about 0.95 and n is an defined above; the total moles of maleimide units in the polymer is yn, wherein y is a number from 0.05 to about 0.95 and n is as defined above; and the total moles of maleic acid (salts) units in the polymer is zn, wherein z is a number from 0.5 to about 0.95 and n is as defined above; and wherein $x+y+z=1$. The various N-substituted maleamic acid units, N-substituted maleimide units and maleic acid (and salts) units may be distributed randomly or otherwise in the polymer.

The scale inhibitory power of various polymers has been evaluated using the following screening procedures employing test chemicals of reagent grade:

Calcium, magnesium, and bicarbonate were supplied by $CaCl_2.4H_2O$; $MgSO_4.7H_2O$; and $NaHCO_3$ respectively. The inhibitor concentrations were equivalent in each test class, unless otherwise indicated. The orthophosphate was supplied by $H_3PO_4$ and the organophosphorus materials obtained from commercial suppliers. Each test solution was stirred with a teflon coated stir bar in a jacketed glass beaker. Temperature was maintained using a Lauda recirculating, constant-temperature bath. The pH was determined with Fisher Accumet meter (Model 610A) and a combination electrode. The pH meter was calibrated with two standard buffers (pH 7 and 10) and corrections were made for temperature changes.

Calcium and Magnesium Phosphate Inhibition

Calcium and magnesium were added to provide initial concentrations of 250 and 125 mg/L. An equal amount of phosphate was added to each test solution, and the inhibitor concentrations are listed in Table I and II. The temperature of the test solutions was maintained at 158° F. (70° C.). Using dilute aqueous NaOH, the pH was slowly increased to 8.5 and maintained during the four hour duration of the test. Mineral solubility calculations indicate supersaturation ratios for calcium phosphate > 10,000 and magnesium phosphate > 600 were initially present and the system was under highly stressed conditions. At the conclusion of each test, each solution was filtered (0.45 um) and the orthophosphate concentration was determined spectrophotometrically (700 nm) after formation of a blue phosphomolybdate complex. The inhibition of calcium phosphate is determined by Equation 1:

$$\% \text{ Inhibition} = \frac{\text{filtered sample} - \text{blank}}{\text{unfiltered sample} - \text{blank}} \quad (1)$$

In the absence of the polymers described herein, % Inhibition equals 0. Non-zero volumes represent scale inhibition benefits associated with the addition of an active polymer to the system being tested.

The foregoing procedure was used to collect data on specific copolymers and terpolymers according to the invention; and the results are set forth in Table I and Table II below.

TABLE I

SULFOALKYLACRYLAMIDE-, SULFOPHENYLACRYLAMIDE-, PHOSPHONOALKYLACRYLAMIDE-, CARBOXYALKYLACRYLAMIDE-, AND POLYHYDROXYALKYLAMIDE-CONTAINING POLYMERS

| SAMPLE | POLYMER COMPOSITION MOLE % | MOLECULAR WEIGHT, Mw | % PHOSPHATE SALT INHIBITION P.P.M. POLYMER ACTIVES | | | |
|---|---|---|---|---|---|---|
| | | | 5 | 7.5 | 10 | 20 |
| A | Acrylic Acid 84/Sulfoethylacrylamide 16 | 31,300 | 7 | | 90 | 97 |
| $A_1$ | Acrylic Acid 79/Sulfoethylacrylamide 21 | 6,000 | | | 60 | 95 |
| B | Acrylic Acid 60/Acrylamide 25/Solfoethylacrylamide 15 | 10,600 | 38 | | 99 | |
| $B_1$ | Acrylic Acid 52/Acrylamide 40/Sulfoethylacrylamide 7 | 45,300 | 70 | | 93 | |
| $B_2$ | Acrylic Acid 78/Acrylamide 11/Sulfoethylacrylamide 11 | 53,800 | 0 | | 94 | |
| $B_3$ | Acrylic Acid 23/Acrylamide 51/Sulfoethylacrylamide 26 | 43,400 | 97 | | 93 | |
| $B_4$ | Acrylic Acid 66/Acrylamide 9/Sulfoethylacrylamide 26 | 55,900 | 70 | | 92 | |
| $B_5$ | Acrylic Acid 27/Acrylamide 27/Sulfoethylacrylamide 46 | 48,400 | 94 | | 100 | |
| $B_6$ | Acrylic Acid 67/Acrylamide 10/Sulfoethylacrylamide 22 | 22,100 | 73 | | 99 | |
| $B_7$ | Acrylic Acid 56/Acrylamide 13/Sulfoethylacrylamide 32 | 55,700 | 66 | | 100 | |
| $B_8$ | Acrylic Acid 34/Acrylamide 16/Sulfoethylacrylamide 50 | 52,200 | 97 | | 94 | |
| C | Acrylic Acid 51/Acrylamide 32/Sulfoethylacrylamide 17 | 33,000 | 94 | 97 | | |
| $C_1$ | Acrylic Acid 19/Acrylamide 27/Sulfoethylacrylamide 54 | 44,100 | 97 | | 99 | |
| D | Acrylic Acid/Ethyl Acrylate/Sulfoethylacrylamide 14 | 3,700 | | 93 | 100 | |
| E | Acrylic Acid 60/Acrylamide 20/Sulfomethylacrylamide 20 | 55,800 | 38 | 95 | | |
| F | Acrylic Acid 69/Acrylamide 17/Sulfomethylacrylamide 14 | 19,600 | 43 | 98 | | |
| G | Acrylic Acid 25/Acrylamide 55/Sulfomethylacrylamide 20 | 12,200 | 10 | 34 | 80 | |
| $G_1$ | Acrylic Acid 37/Acrylamide 23/Sulfomethylacrylamide 41 | 81,700 | 94 | | 94 | |
| $G_2$ | Acrylic Acid 80/Acrylamide 10/Sulfomethylacrylamide 10 | 37,500 | | | 94 | |
| $G_3$ | Acrylic Acid 30/Acrylamide 60/Sulfomethylacrylamide 10 | 80,300 | | | 94 | |
| $G_4$ | Acrylic Acid 95/Acrylamide 0/Sulfomethylacrylamide 5 | 18,000 | | | 95 | |
| $G_5$ | Acrylic Acid 13/Acrylamide 85/Sulfomethylacrylamide 2 | 11,700 | | | 90 | |
| H | Acrylic Acid 80/Acrylamide 5/2-Hydroxy-3-sulfopropyl-acrylamide 15 | 17,400 | 9 | | 99 | |
| I | Acrylic Acid 80/Acrylamide 5/2-Hydroxy-3-sulfopropyl-acrylamide 15 | 68,500 | 6 | | 100 | |
| J | Acrylic Acid 50/Acrylamide 15/2-Hydroxy-3-sulfopropyl-acrylamide 35 | 25,800 | | | 84 | |
| K | Acrylic Acid 20/Acrylamide 10/2-Hydroxy-3-sulfopropyl-acrylamide 70 | 28,600 | | | 89 | |
| L | Acrylic Acid 80/Acrylamide 5/2-Hydroxy-3-sulfopropyl-acrylamide 15 | 36,500 | 12 | 45 | 100 | |
| M | Acrylic Acid 30/Acrylamide 62/Phosphonopropylacrylamide 8 | 11,100 | 10 | 10 | | 95 |
| N | Acrylic Acid 45/Acrylamide 45/Sulfophenylacrylamide 10 | 11,500 | 7 | 90 | 97 | |
| O | Acrylic Acid 85/Acrylamide 5/Carboxymethylacrylamide 10 | 38,600 | | | 4 | 78 |
| P | Acrylic Acid 50/Acrylamide 35/Carboxypentylacrylamide 15 | 14,100 | 8 | 94 | 98 | |
| Q | Acrylic Acid/Acrylamide/N-(1,2-Dicarboxy)ethylacrylamide | 13,500 | 8 | 89 | 100 | |
| R | Acrylic Acid 51/Acrylamide 32/N-(2,3-Dihydroxy)propyl-acrylamide 17 | 14,600 | 10 | 75 | 98 | |
| S | Acrylic Acid 50/Acrylamide 38/N-(2,3-Dihydroxy)propyl- | | | | | |

TABLE I-continued

SULFOALKYLACRYLAMIDE-, SULFOPHENYLACRYLAMIDE-, PHOSPHONOALKYLACRYLAMIDE-, CARBOXYALKYLACRYLAMIDE-, AND POLYHYDROXYALKYLAMIDE-CONTAINING POLYMERS

| SAMPLE | POLYMER COMPOSITION MOLE % | MOLECULAR WEIGHT, Mw | % PHOSPHATE SALT INHIBITION P.P.M. POLYMER ACTIVES | | | |
|---|---|---|---|---|---|---|
| | | | 5 | 7.5 | 10 | 20 |
| | acrylamide 12 | 76,600 | | | 33 | 99 |
| T | Acrylic Acid 75/Acrylamide 15/ N-(2-Methyl-1,3-dihydroxy)- 2-propylacrylamide 10 | 16,000 | | 23 | 82 | |
| U | Acrylic Acid 45/Acrylamide 50/ N-(2-Hydroxymethyl-1,3-dihydroxy)- 2-propylacrylamide 5 | 11,600 | | | 99 | |

TABLE II

MALEIC ANHYDRIDE POLYMERS REACTED WITH AMINO-SULFONATE COMPOUNDS

| SAMPLE | ANHYDRIDE POLYMER AND MOLE RATIO ANHYD. GP: AMINE* | Mw (GPC) | % PHOSPHATE SALT INHIBITION P.P.M. POYLMER ACTIVES | |
|---|---|---|---|---|
| | | | 10 | 20 |
| AA | SMA-1000 + Na Sulfanilate 1:0.67 | 6,560 | 22 | 95 |
| BB | Gantrez AN-119 + Na Sulfanilate 1:0.67 | 9,800 | 16 | 92 |
| CC | SMA-3000 + Na Sulfanilate 1:1 | 11,000 | 21 | 90 |
| DD | Gantrez An-149 + Na Sulfanilate 1:1 | 95,400 | 63 | 80 |
| EE | Gantrez An-149 + Na Taurate 1:1 | 98,900 | 56 | 83 |
| FF | MAH/MVE (Med. MW) + Na Taurate 1:1 | 32,800 | 82 | |
| GG | MAH/MVE (Med. MW) + Na Sulfanilate 1:1 | 39,700 | 49 | |
| HH | MAH/NVP + Na Taurate 1:1 | 17,800 | 77 | 99 |
| II | MAH/Am + Na Taurate 1:1 | 8,330 | 17 | 98 |
| JJ | Gantrez AN-149 + Na Sulfanilate 1:0.5 | 28,000 | 84 | |
| KK | MAH/MVE (Med. MW) + Na Taurate 1:0.5 | 41,600 | 19 | 50 |
| LL | MAH/Hexene + Na Taurate 1:0.5 | 37,300 | 11 | 69 |

*Abbreviations as follows:
SMA - 1000 or 3000 (ARCO) styrene-maleic anhydride copolymer
Gantrez - (GAF) maleic anhydride-methyl vinyl ether copolymer
MAH - maleic anhydride
MVE - methyl vinyl ether
- N-vinylpyrrolidone
Am - acrylamide Phosphate Salt Inhibition in Presence of Iron The test procedure is identical to the one previously described "Calcium and Magnesium Phosphates", except that 3 p.p.m. of soluble Fe(II) and 10 p.p.m. of polymeric inhibitor are added. The criterion for determining scale inhibiting activity is the same as in the original test. The presence of iron applies additional stress upon the polymeric material and % inhibition values tend to show a decrease. As the activity of the polymer increases, that decrease in % inhibition is minimized. This procedure was used to collect data on specific co- and terpolymers (10 p.p.m. actives dosage) and the results are set forth in Table III below:

TABLE III

SULFOALKYLACRYLAMIDE-, SULFOPHENYLACRYLAMIDE-, PHOSPHONOALKYLACRYLAMIDE-, CARBOXYALKYLACRYLAMIDE-, AND POLYHYDROXYALKYLAMIDE-CONTAINING POLYMERS

| SAMPLE | POLYMER COMPOSITION MOLE % | MOLECULAR WEIGHT, Mw | % PHOSPHATE SALT INHIBITION (with 3 ppm soluble iron) |
|---|---|---|---|
| A | Acrylic Acid 84/ Sulfoethylacrylamide 16 | 31,300 | 8 |
| $A_1$ | Acrylic Acid 79/ Sulfoethylacrylamide 21 | 6,000 | 23 |
| B | Acrylic Acid 60/Acrylamide 25/ Sulfoethylacrylamide 15 | 10,600 | 98 |
| $B_1$ | Acrylic Acid 52/Acrylamide 40/ Sulfoethylacrylamide 7 | 45,300 | 96 |
| $B_2$ | Acrylic Acid 78/Acrylamide 11/ Sulfoethylacrylamide 11 | 53,800 | 51 |
| $B_3$ | Acrylic Acid 23/Acrylamide 51/ Sulfoethylacrylamide 26 | 43,400 | 97 |
| $B_4$ | Acrylic Acid 66/Acrylamide 9/ Sulfoethylacrylamide 26 | 55,900 | 92 |
| $B_5$ | Acrylic Acid 27/Acrylamide 27/ Sulfoethylacrylamide 46 | 48,400 | 76 |
| $B_6$ | Acrylic Acid 67/Acrylamide 10/ Sulfoethylacrylamide 22 | 22,100 | 8 |
| $B_7$ | Acrylic Acid 56/Acrylamide 13/ | | |

TABLE III-continued
SULFOALKYLACRYLAMIDE-, SULFOPHENYLACRYLAMIDE-, PHOSPHONOALKYLACRYLAMIDE-, CARBOXYALKYLACRYLAMIDE-, AND POLYHYDROXYALKYLAMIDE-CONTAINING POLYMERS

| SAMPLE | POLYMER COMPOSITION MOLE % | MOLECULAR WEIGHT, Mw | % PHOSPHATE SALT INHIBITION (with 3 ppm soluble iron) |
|---|---|---|---|
| | Sulfoethylacrylamide 32 | 55,700 | 97 |
| $B_8$ | Acrylic Acid 34/Acrylamide 16/ Sulfoethylacrylamide 50 | 52,200 | 83 |
| C | Acrylic Acid 51/Acrylamide 32/ Sulfoethylacrylamide 17 | 33,000 | 98 |
| D | Acrylic Acid/Ethyl Acrylate/ Sulfoethylacrylamide 14 | 3,700 | 19 |
| E | Acrylic Acid 60/Acrylamide 20/ Sulfomethylacrylamide 20 | 55,800 | 90 |
| F | Acrylic Acid 69/Acrylamide 17/ Sulfomethylacrylamide 14 | 19,600 | 28 |
| G | Acrylic Acid 25/Acrylamide 55/ Sulfomethylacrylamide 20 | 12,200 | 22 |
| $G_1$ | Acrylic Acid 37/Acrylamide 23/ Sulfomethylacrylamide 41 | 81,700 | 93 |
| $G_2$ | Acrylic Acid 80/Acrylamide 10/ Sulfomethylacrylamide 10 | 37,500 | 11 |
| $G_3$ | Acylic Acid 30/Acrylamide 60/ Sulfomethylacrylamide 10 | 80,300 | 5 |
| $G_4$ | Acrylic Acid 95/Acrylamide 0/ Sulfomethylacrylamide 5 | 18,000 | 98 |
| H | Acrylic Acid 80/Acrylamide 5/ 2-Hydroxy-3-sulfopropyl- acrylamide 15 | 17,400 | 21 |
| I | Acrylic Acid 80/Acrylamide 5/ 2-Hydroxy-3-sulfopropyl- acrylamide 15 | 68,500 | 7 |
| J | Acrylic Acid 50/Acrylamide 15/ 2-Hydroxy-3-sulfopropyl- acrylamide 35 | 25,800 | 47 |
| K | Acrylic Acid 20/Acrylamide 10/ 2-Hydroxy-3-sulfopropyl- acrylamide 70 | 28,600 | 95 |
| L | Acrylic Acid 80/Acrylamide 5/ 2-Hydroxy-3-sulfopropyl- acrylamide 15 | 36,500 | 8 |
| M | Acrylic Acid 30/Acrylamide 62/ Phosphonopropylacrylamide 8 | 11,100 | — |
| N | Acrylic Acid 45/Acrylamide 45/ Sulfophenylacrylamide 10 | 11,500 | — |
| O | Acrylic Acid 85/Acrylamide 5/ Carboxymethylacrylamide 10 | 38,600 | — |
| P | Acrylic Acid 50/Acrylamide 35/ Carboxypentylacrylamide 15 | 14,100 | 88 |
| Q | Acrylic Acid/Acrylamide/ N-(1,2-Dicarboxy)ethylacrylamide | 13,500 | 35 |
| R | Acrylic Acid 51/Acrylamide 32/ N-(2,3-Dihydroxy)propyl- acrylamide 17 | 14,600 | 10 |
| S | Acrylic Acid 50/Acrylamide 38/ N-(2,3-Dihydroxy)propyl- acrylamide 12 | 76,600 | — |
| T | Acrylic Acid 75/Acrylamide 15/ N-(2-Methyl-1,3-dihydroxy)- 2-propylacrylamide 10 | 16,000 | 22 |
| U | Acrylic Acid 45/Acrylamide 50/ N-(2-Hydroxymethyl-1,3-dihydroxy)- 2-propylacrylamide 5 | 11,600 | — |

Barium Sulfate Inhibition

Calcium and magnesium were added to provide initial concentrations of 150 and 50 mg/L. Sodium sulfate was used to increase the initial $SO_4^{-2}$ concentration to 500 mg/L. The inhibitor was added (25 mg/L as is) to each test solution, and the temperature was maintained at 104° F. (40° C.). The pH was slowly adjusted to 4.5 and the solution's transmittance determined with a Brinkmann probe colorimeter (PC 801). The barium titrant solution (500 mg/L) was added at a slow, constant rate and the transmittance of the test solution monitored continuously. The test was terminated when turbidity was initially observed (1% transmittance decrease) and the barium level determined from the amount of titrant added. Atomic absorption was used to verify the barium concentration in selected samples.

Data recorded for various terpolymers are included in Table IV below.

TABLE IV
BARIUM SULPHATE INHIBITION

| Sample | Composition* | (mol %) | Mw | Polymer Dosage** (ppm Actives) | Ba +2 Level (ppm)*** |
|---|---|---|---|---|---|
| Blank | — | — | — | — | 2–3 |
| a | AA/Am/ | (30/50/20) | 4,600 | 7.6 | 4.2 |

TABLE IV-continued
BARIUM SULPHATE INHIBITION

| Sample | Composition* | (mol %) | Mw | Polymer Dosage** (ppm Actives) | Ba +2 Level (ppm)*** |
|---|---|---|---|---|---|
| b | AA/Am/AMS | (69/17/14) | 18,900 | 9.0 | 5.4 |
| c | AA/Am/AMS | (69/17/14) | 64,200 | 9.0 | 6.6 |
| d | AA/Am/2-AES | (79/0/21) | 5,800 | 6.2 | 5.3 |
| e | AA/Am/2-AES | (90/0/10) | 5,800 | 5.4 | 4.5 |
| f | AA/Am/2-AES | (56/27//17) | 4,500 | 8.0 | 10.8 |
| g | AA/Am/2-AES | (60/25/15) | 10,600 | 8.0 | 4.4 |
| h | AA/Am/AHPS | (40/50/10) | 21,700 | 8.8 | 4.4 |
| i | AA/Am/AHPS | (50/30/20) | 24,200 | 10.0 | 4.5 |
| j | AA/Am/AHPS | (50/15/35) | 25,800 | 9.5 | 10.2 |
| k | AA/Am/AHPS | (20/10/70) | 28,600 | 12.0 | 4.1 |

*refer to abbreviations listed hereinafter
**all products tested at a level of 25 ppm (as is)
***larger values represent greater performance
Abbreviations:*
AA = acrylic acid
ABA = 2-acrylamido-butanedioic acid
Am = acrylamide
AMPD = 2-acrylamido-2-methyl-1,3-propanediol
AMS = acrylamidomethanesulfonic acid
2-AES = 2-acrylamidoethanesulfonic acid
AHPS = 3-acrylamido-2-hydroxypropanesulfonic acid
AHEA = acrylamido-2-hydroxyethanoic acid
MBA = methylbutylamine

Calcium Carbonate Inhibition

Calcium, magnesium, and bicarbonate were respectively added to provide initial concentrations of 360, 200 and 500 mg/L. The performance of each inhibitor was determined as indicated in Table V. The test temperature was maintained at 140° F. (60° C.). Aqueous NaOH titrant was added at a constant rate, and the pH increase was continuously monitored. When bulk precipitation of calcium carbonate occurred, a slight decrease in the pH was observed. Based on the test conditions at that pH breakpoint, a mineral solubility computer program is used to calculate the $CaCO_3$ supersaturation ratio as indicated in Table V below. Calcium carbonate inhibition performance is believed related to the supersaturation ratio which can be maintained. After each test, dilute aqueous HCl was used to remove all precipitated calcium carbonate from the test apparatus.

Calcium Phosphate Inhibition

Calcium and a mixture of HEDP and PBTC were added to provide initial concentrations of 360 mg/L and 8 ppm (total phosphorus as $PO_4$), respectively. The temperature was maintained at 140° F. (60° C.). Using dilute aqueous NaOH, the pH was slowly increased to 9.2 and maintained during the four hour duration of the test. At the conclusion of each test, each solution was filtered (0.45 um) and the total phosphorus concentration was determined by a standard spectrophotometric procedure. The inhibition of calcium organophosphorus compounds were determined by Equation 1; and data are set forth in Table V below.

TABLE V
CALCIUM CARBONATE AND CALCIUM ORGANOPHOSPHORUS INHIBITION

| Sample | Polymer Composition* | (mol %) | Mw | Ca Phosphonate (% Inhibition) 10 ppm Polymer Actives | Ca Carbonate (Sat. Ratio) 10 ppm Polymer Actives |
|---|---|---|---|---|---|
| Blank | — | — | — | 0 | 16 |
| HEDP | — | — | — | — | 160 |
| ab | AA/Am/AMS | (25/55/20) | 12,200 | 94 | 58 |
| ac | Gantrez-MBA | | 69,200 | 98 | 72 |
| ad | AA/Am/AHEA | | 42,900 | 98 | 180 |
| ae | AA/Am/ABA | | 13,500 | 100 | 91 |
| af | AA/Am/AHPS | | 11,300 | 100 | 47 |
| ag | AA/Am/AMPD | (50/30/20) | 16,000 | 100 | 89 |

*refer to listing of abbreviations hereinabove in Table IV
NOTE: Larger values for % inhibition and saturation ratio indicate greater performance.

Benchtop Test Procedures for Particle Dispersion

The particulate matter used in these tests was obtained from commercial sources. Calcium and magnesium were present at concentrations of 90 and 50 mg/L, respectively. Bicarbonate was added to provide an "M" alkalinity of ~100 mg/L. The dispersing agent and particulate matter were added and the solution stirred at 100 rpm using a motor-driven, stainless steel paddle. At the end of each test, the level of dispersion was measured with visible light absorption or nephelometry. Variations in the general procedure are listed below:

Iron Oxide—$Fe_2O_3$ powder (100 mg) was used and the test solution stirred for two hours. Dispersion was measured using a Brinkmann probe colorimeter (470 nm) as the solution was stirred. The relative level of dispersion was calculated using Equation 2:

$$\text{Relative dispersion} = \frac{\text{sample with dispersing agent}}{\text{sample without dispersing agent}} \quad (2)$$

Calcium Carbonate—$CaCO_3$ powder (200 mg) was used and the test solution was stirred for one hour. The particulates were allowed to settle for one hour and an aliquot withdrawn from 1 cm beneath the sample's surface. An HF Instruments nephelometer (Model DRT 1000) was used to determine the final level of suspended solids. Equation 2 was used to calculate the relative dispersion.

Calcium Phosphate—$Ca_3(PO_4)_2$ powder (200 mg) was used and the test procedure conducted in a manner similar to that used for calcium carbonate.

The data from particle dispersion determinations are collected in Table VI below.

TABLE VI

MINERAL DISPERSANCY

| Sample | Polymer Composition* | (mol %) | Mw | Relative Dispersancy** | | |
|---|---|---|---|---|---|---|
| | | | | Iron Oxide | Calcium Carbonate | Calcium Phosphate |
| Blank | — | — | — | 1.0 | 1.0 | 1.0 |
| ba | AA/Am/AMS | (25/55/20) | 12,200 | 7.2 | 5.8 | 3.1 |
| bb | Gantrez-MBA | | 69,200 | 3.8 | 3.0 | 3.1 |
| bc | AA/Am/AHEA | | 42,900 | 1.6 | 5.0 | 2.3 |
| bd | AA/Am/ABA | | 13,500 | 7.8 | 5.2 | 3.4 |
| be | AA/Am/AHPS | | 11,300 | 7.0 | 4.8 | 3.6 |
| bf | AA/Am/AMPD | (50/30/20) | 16,000 | 5.0 | 5.0 | 2.9 |

*refer to listing of abbreviations hereinabove in Tables II and IV
**see Equation 2. 1 ppm polymer active
NOTE: Larger values for relative dispersancy indicate greater performance The data presented in Tables I-VI inclusive amply demonstrate that polymers and terpolymers according to the invention are capable of functioning positively in a commercial, scale inhibition and dispersancy environment.

Sulfomethylamide-, Sulfoethylamide-, 2-Hydroxy-3-Sulfopropylamide-, 2,3-Dihydroxypropylamide-, and Sulfophenylamide-Polymer Species In one important aspect, the present invention is characterized by the molecular modification of a pre-existing polymer chain of suitable length so as to incorporate a sulfonate substituent, as distinguished from attempts to build up a sufficiently large polymer from sulfonated monomers. One post-modification procedure of the invention calls for the reaction of an acrylamide-containing polymer and a selected aminosulfonic acid; and this reaction is believed to proceed by a transamidation mechanism.

Preferred aminosulfonic acids for use in this aspect of the invention include aminomethanesulfonic acid, 1-amino-2-hydroxy-3-propanesulfonic acid, 2,3-dihydroxypropylamine, 2-aminoethanesulfonic acid (taurine), and 4-aminobenzenesulfonic acid (p-sulfanilic acid), although 3-aminobenzenesulfonic acid (metallic acid) may also be employed. In addition, the alkali metal salts of these acids can be used in the practice of the invention.

The selected aminosulfonic acid is advantageously added to a water solution of sodium hydroxide and the polyacrylamide reactant; and the resultant mixture is then heated in a pressure reactor to a suitable temperature, such as 150° C., for a suitable length of time, such as 4-5 hours. After the reaction has gone to the desired extent, the mixture is cooled and thereafter either concentrated or dewatered to recover the adduct.

Sulfomethylamide polymers can also be prepared by reacting polyacrylamide with formaldehyde-bisulfite or with aminomethane sulfonic acid at a suitable temperature, such as 150° C., for a suitable length of time, such as 4-5 hours.

The acrylamide-containing polymers for use in the present invention include homopolymers of acrylamide and their homologs, such as the homopolymers of methyacrylamide, and copolymers, including terpolymers, of acrylamide, or its homologs, with acrylic acid, or its homologs, such as methacrylic acid, as well as homopolymers of (meth)acrylate esters, itaconic acid and esters, crotonic acid and esters, acrylonitrile and the like. It has been discovered that desirable, secondary amide formation is promoted in the reaction system of the invention when the acrylamide-containing polymer is selected to contain a mole ratio of acrylamide or homologous units of at least about 10% and preferably 30% or higher.

The sulfonated reaction products of the invention are useful scale inhibitors as evidenced by phosphate-inhibition test results, which are also strongly indicative of the suitability of these adducts in various product environments.

In order to describe the instant species of the invention more fully, the following working examples are given:

EXAMPLE 1

A mixture of poly(acrylamide [50 mole %]-acrylic acid) (150 g 31.5% solution in water, Mw 55,700); taurine (16.7 g); and sodium hydroxide (10.6 g 50% solution in water) was heated in a mini Parr pressure reactor at 150° C. for four hours. The reaction mixture was then cooled to room temperature. The molecular weight of the resulting polymer, determined by GPC using polystyrene sulfonate standard, was 56,000. The composition of the polymer was determined both by C-13 NMR and colloid titration and was found to contain about 50% carboxylate, 31% primary amide and 19% sulfoethylamide.

EXAMPLE 2

A mixture of poly(acrylamide [75 mole %]-acrylic acid) (150 g of 27.5% solution in water); sulfanilic acid (20.4 g); sodium hydroxide (9.3 g of 50% solution); and 10.5 g of water was heated in a mini Parr pressure reactor at 150° C. for five hours. The reaction mixture was thereafter cooled to room temperature. The molecular weight of the resulting polymer was 11,500 as determined by GPC using polystyrene sulfonate standard. The polymer contained about 5% sulfophenylamide, 47.5% primary amide and 47.5% carboxylate as estimated by C-13 NMR. At 5 ppm of the polymer, there was 7% phosphate inhibition; at 7.5 ppm polymer, 96% phosphate inhibition; and at 10 ppm, 100% phosphate inhibition.

EXAMPLE 3

A mixture of poly(acrylamide [75 mole %]-acrylic acid) (150 g of 27.5% solution in water); aminomethane sulfonic acid (13.2 g); and sodium hydroxide (10.2 g of 50% solution) was heated in a mini Parr pressure reactor at 125° C. for four-and-a-half hours. The reaction mixture was thereafter cooled to room temperature. The molecular weight of the resulting polymer was 15,900 as determined by GPC using polystyrene sulfonate standard. The polymer contained about 45% acrylic acid, 40% acrylamide and 15% sulfomethylacrylamide as estimated by C-13 NMR.

Sulfonated Maleic Anhydride Polymer Species

This aspect of the post-modification procedure of the invention calls for the addition reaction of a selected aminosulfonic acid, or its alkali metal salt, and maleic anhydride homopolymer, copolymer or terpolymer of maleic anhydride and vinylic compounds.

The present reaction is caused to take place in a suitable solvent, such as dimethylformamide, under heating, agitation and reflux conditions; and preferred aminosulfonate sources include 4-aminobenzenesulfonic acid (p-sulfanilic acid), 2-aminoethanesulfonic acid (taurine), and the alkali metal salts thereof. 3-Aminobenzenesulfonic acid (metallic acid) and its alkali metal salts may also be employed.

The copolymers, including terpolymers, which find utility in the present species of the invention are made up of maleic anhydride and like ring compounds which have been reacted with suitable monomers such as styrene, methyl vinyl ether, N-vinylpyrrolidone, N-vinylcaprolactam and N-methyl-N-vinylacetamide, (meth)acrylamide, (meth)acrylic acid, (meth)acrylate esters, vinyl esters such as vinyl acetate, alkenes such as 1-hexene, 1-butene and dienes such as butadiene and cyclopantadiene, for example.

The maleic anhydride homo-, co- and terpolymers are reacted with from 5 to 100 mole % of the aminosulfonate compound per mole of anhydride group in the polymer. The molecular weight of the resulting polymers have a weight average molecular weight in the range of from about 1000 to about 120,000 and preferably from about 3000 to 100,000 as determined by gel permeation chromatography.

In order to describe this aspect of the invention more fully, the following working example is given:

EXAMPLE 4

To a reaction flask fitted with a reflux condenser, mechanical stirrer, nitrogen sparging tube and a thermometer, there was added 15.6 g (0.1 mole) of Gantrez AN-149 (a 1:1 mole ratio copolymer of maleic anhydride and methyl vinyl ether) and 200 g of dimethylformamide solvent. The resultant mixture was heated under a nitrogen gas atmosphere to dissolve the polymer. A highly colored solution, red-violet in hue, resulted. After all the polymer was visibly dissolved, at a temperature of about 120° C., 21.3 g (0.1 mole) of sodium sulfanilate monohydrate was added to the reaction flask together with a further 100 g of dimethylformamide.

Heating was continued until the solution refluxed, at a temperature of about 144-148° C.; and refluxing was continued for four hours. During this time, an intense blue-purple color developed and solids precipitated. After refluxing was completed, the entire reaction mixture (precipitate and solvent solution) was concentrated on a rotary evaporator under vacuum. A dark blue solid resulted, and this was subject to final drying in a vacuum oven at 50° C. for 24 hours. A very dark colored solid, 35 g in weight, remained. This solid was dissolved easily in water with the addition of a small amount of sodium hydroxide to give a solution of deep blue color.

The molecular weight of the resultant polymer was estimated to be 95,400 by GPC using polystyrene sulfonate standard and its infra-red spectrum showed absorptions at 1770 cm$^{-1}$ (cyclic imide), 1700 cm$^{-1}$ (cyclic imide and carboxyl), 1650 cm$^{-1}$ (amide carbonyl), 1590 cm$^{-1}$ (carboxylate) and 1560 cm$^{-1}$ (amide II band). The polymer contained about 81M % maleimide units, about 14M % maleic acid units and about 5M % maleamic acid units as estimated by infra-red and LC analysis for residual amonisulfonate compound.

The calcium phosphate inhibition propensity of the product of Example 4 was tested and is compared with other maleic anhydride, aminosulfonated polymers made according to the invention in Table II hereinabove.

The manner in which the present invention may be practiced and the purpose to which it may be put are evident from the foregoing descriptions.

The invention is claimed as follows:

1. A method of controlling scale deposits by adding to waters having a tendency to form scale, a scale-inhibitorily effective amount of a derivatized maleic anhydride polymer having N-substituted maleamic units, N-substituted maleimide units and maleic acid (and salts) units, said units having respectively structures as follows:

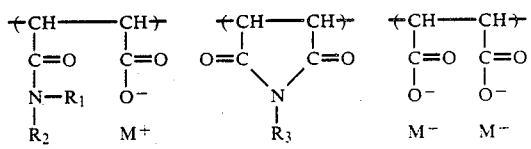

wherein $R_1$, $R_2$ and $R_3$ are each independently chosen from the group consisting of hydrogen, sulfonic acid substituted phenyl, and linear or branched sulfonic acid substituted alkyl of from one to ten carbon atoms and combinations thereof, wherein at least one of $R_1$, $R_2$ and $R_3$ is sulfophenyl or sulfoalkyl, and wherein $M^+$ is $H^+$, alkali metal ion, alkaline earth metal ion, ammonium ion or zinc ion, and wherein the total moles of N-substituted maleamic units, N-substituted maleimide units and maleic acid (and salts) units in said derivatized maleic anhydride polymer is n, wherein n is a number in the range of from 10 to about 1200, wherein the total moles of said N-substituted maleamic units in said derivatized maleic anhydrided polymer is xn, wherein x is a number from about 0.5 to about 0.95 and n is as defined above;

wherein the total moles of said N-substituted maleimide units in said derivatized maleic anhydride polymer is yn, wherein y is a number from about 0.05 to about 0.95, and n is as defined above;

wherein the total moles of said maleic acid and salts units in said derivatized maleic anhydride polymer is zn, wherein z is a number from about 0.05 to about 0.95 and n is as defined above; and wherein $x+y+z=1$.

2. The method of claim 1 wherein said n is a number of from about 30 to about 1000.

3. A method of controlling scale deposits by adding to waters having a tendency to form scale, a scale-inhibitorily effective amount of a derivatized maleic anhydride polymer having N-substituted maleamic units, N-substituted maleimide units or maleic acid (and salts) units, said units having respectively structures as follows:

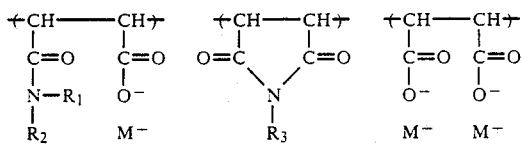

wherein $R_1$, $R_2$ and $R_3$ are each independently chosen from the group consisting of hydrogen, sulfophenyl, and sulfoalkyl, and combinations thereof, wherein at least one of $R_1$, $R_2$ and $R_3$ is sulfophenyl or sulfoalkyl, and wherein $M^+$ is $H^+$, alkali metal ion, alkaline earth metal ion, ammonium ion or zinc ion, wherein the total moles of N-substituted maleamic units, N-substituted maleimide units and maleic acid (and salts) units in said derivatized maleic anhydride polymer is n, wherein n is a number in the range of from about 10 to about 1200, wherein the total moles of said N-substituted maleamic units in said derivatized maleic anhydride polymer is xn, wherein x is a number from about 0.05 to about 0.95 and n is as defined above, wherein the total moles of said N-substituted maleimide units in said derivatized maleic anhydride polmer is yn, wherein y is a number from about 0.05 to about 0.95 and n is as defined above, wherein the total moles of said maleic acid and salts thereof units in said derivatized maleic anhydride polymer is zn, wherein z is a number from about 0.05 to about 0.95 and n is as defined above, wherein $x+y+z-1$, wherein said derivatized maleic anhydride polymer is made by reacting a maleic anhydride homo-co-, or terpolymer with an aminosulfonate source selected from the group consisting of taurine, p-sulfanilic acid or metanilic acid or the alkali metal or ammonium salts thereof, or mixtures thereof.

4. The method according to claim 3 wherein said aminosulfonate source is taurine (2-aminoethylsulfonic acid) or alkali or ammonium salts of taurine.

5. The method according to claim 3 wherein said aminosulfonate source is p-sulfanilic acid or metanilic acid or alkali metal or ammonium salts thereof.

6. The method of claim 3 wherein said n is a number from 30 to about 1000.

* * * * *

UNITED STATES PATENT AND TRADEMARK OFFICE
CERTIFICATE OF CORRECTION

PATENT NO. : 4,919,821

DATED : Apr. 24, 1990

INVENTOR(S) : John E. Hoots, Donald A. Johnson and James Kneller

It is certified that error appears in the above-identified patent and that said Letters Patent is hereby corrected as shown below:

On the title page, under item [19], change "Fong" to --Hoots--; and in item [75], delete "Dodd W. Fong".

Col. 12, line 3, delete "Phosphate" and substitute therefor --Phosphonate--.

Col. 12, line 49, delete "0.5" and substitute therefor --0.05--.

Signed and Sealed this

Seventh Day of April, 1992

Attest:

HARRY F. MANBECK, JR.

*Attesting Officer*     *Commissioner of Patents and Trademarks*